US011962085B2

(12) United States Patent
Shi

(10) Patent No.: US 11,962,085 B2
(45) Date of Patent: Apr. 16, 2024

(54) TWO-PART FOLDED WAVEGUIDE HAVING A SINUSOIDAL SHAPE CHANNEL INCLUDING HORN SHAPE RADIATING SLOTS FORMED THEREIN WHICH ARE SPACED APART BY ONE-HALF WAVELENGTH

(71) Applicant: Aptiv Technologies AG, Schaffausen (CH)

(72) Inventor: Shawn Shi, Thousand Oaks, CA (US)

(73) Assignee: Aptiv Technologies AG, Schaffhausen (CH)

( * ) Notice: Subject to any disclaimer, the term of this patent is extended or adjusted under 35 U.S.C. 154(b) by 282 days.

(21) Appl. No.: 17/388,829

(22) Filed: Jul. 29, 2021

(65) Prior Publication Data

US 2022/0368021 A1 Nov. 17, 2022

Related U.S. Application Data

(60) Provisional application No. 63/188,265, filed on May 13, 2021.

(51) Int. Cl.

| | |
|---|---|
| ***H01Q 13/02*** | (2006.01) |
| ***H01Q 13/22*** | (2006.01) |
| ***H01Q 21/00*** | (2006.01) |

(52) U.S. Cl.

CPC ..... *H01Q 13/0233* (2013.01); *H01Q 13/0283* (2013.01); *H01Q 13/22* (2013.01); *H01Q 21/0043* (2013.01); *H01Q 21/005* (2013.01)

(58) Field of Classification Search

CPC ............... H01Q 13/0233; H01Q 13/22; H01Q 21/0043; H01Q 21/005

(Continued)

(56) References Cited

U.S. PATENT DOCUMENTS

| | | | |
|---|---|---|---|
| 2,851,686 | A | 9/1958 | Hagaman |
| 3,029,432 | A | 4/1962 | Hansen |

(Continued)

FOREIGN PATENT DOCUMENTS

| | | |
|---|---|---|
| CA | 2654470 | 12/2007 |
| CN | 1254446 A | 5/2000 |

(Continued)

OTHER PUBLICATIONS

"Extended European Search Report", EP Application No. 18153137.7, dated Jun. 15, 2018, 8 pages.

(Continued)

*Primary Examiner* — Benny T Lee

(74) *Attorney, Agent, or Firm* — Harness, Dickey & Pierce, P.L.C.

(57) ABSTRACT

This document a two-part folded waveguide with horns. For example, a waveguide includes a channel with an opening in a longitudinal direction at one end, and a sinusoidal shape that folds back and forth about a longitudinal axis that runs in the longitudinal direction through the channel. One part of the waveguide defines a surface of the channel featuring a plurality of radiation slots in the shape of a horn, which allows the two parts of the waveguide to be arranged and configured as one component. A first part of the waveguide has slots and an upper half of the walls of the channel and a second part provides a lower half of the walls of the channel and a surface of the channel opposite the slots. Using horns in combination with two parts enables ease of manufacturing a waveguide with an internal channel having a folded or sinusoidal shape.

19 Claims, 9 Drawing Sheets

(58) Field of Classification Search
USPC .......................................................... 343/771
See application file for complete search history.

(56) References Cited

U.S. PATENT DOCUMENTS 3,032,762 A 5/1962 Kerr
3,328,800 A 6/1967 Algeo
3,462,713 A 8/1969 Knerr
3,473,162 A 10/1969 Veith
3,579,149 A 5/1971 Ramsey
3,594,806 A 7/1971 Black et al.
3,597,710 A 8/1971 Levy
3,852,689 A 12/1974 Watson
4,157,516 A 6/1979 Van De Grijp
4,291,312 A 9/1981 Kaloi
4,453,142 A 6/1984 Murphy
4,562,416 A 12/1985 Sedivec
4,590,480 A 5/1986 Nikolayuk et al.
4,839,663 A 6/1989 Kurtz
5,030,965 A 7/1991 Park et al.
5,047,738 A 9/1991 Wong et al.
5,065,123 A 11/1991 Heckaman et al.
5,068,670 A 11/1991 Maoz
5,113,197 A 5/1992 Luh
5,337,065 A 8/1994 Bonnet et al.
5,350,499 A 9/1994 Shibaike et al.
5,541,612 A 7/1996 Josefsson
5,638,079 A 6/1997 Kastner et al.
5,923,225 A 7/1999 Santos
5,926,147 A 7/1999 Sehm et al.
5,982,256 A 11/1999 Uchimura et al.
5,986,527 A 11/1999 Ishikawa et al.
6,072,375 A 6/2000 Adkins et al.
6,166,701 A 12/2000 Park et al.
6,414,573 B1 7/2002 Swineford et al.
6,489,855 B1 12/2002 Kitamori et al.
6,535,083 B1 3/2003 Hageman et al.
6,622,370 B1 9/2003 Sherman et al.
6,788,918 B2 9/2004 Saitoh et al.
6,794,950 B2 9/2004 Du Toit et al.
6,859,114 B2 2/2005 Eleftheriades et al.
6,867,660 B2 3/2005 Kitamori et al.
6,958,662 B1 10/2005 Salmela et al.
6,992,541 B2 1/2006 Wright et al.
7,002,511 B1 2/2006 Ammar et al.
7,091,919 B2 8/2006 Bannon
7,142,165 B2 11/2006 Sanchez et al.
7,420,442 B1 9/2008 Forman
7,439,822 B2 10/2008 Shimura et al.
7,495,532 B2 2/2009 McKinzie, III
7,498,994 B2 3/2009 Vacanti
7,626,476 B2 12/2009 Kim et al.
7,659,799 B2 2/2010 Jun et al.
7,886,434 B1 2/2011 Forman
7,973,616 B2 7/2011 Shijo et al.
7,994,879 B2 8/2011 Kim et al.
8,013,694 B2 9/2011 Hiramatsu et al.
8,089,327 B2 1/2012 Margomenos et al.
8,159,316 B2 4/2012 Miyazato et al.
8,395,552 B2 3/2013 Geiler et al.
8,451,175 B2 5/2013 Gummalla et al.
8,451,189 B1 5/2013 Fluhler
8,576,023 B1 11/2013 Buckley et al.
8,604,990 B1 12/2013 Chen et al.
8,692,731 B2 4/2014 Lee et al.
8,717,124 B2 5/2014 Vanhille et al.
8,803,638 B2 8/2014 Kildal
8,948,562 B2 2/2015 Norris et al.
9,007,269 B2 4/2015 Lee et al.
9,203,139 B2 12/2015 Zhu et al.
9,203,155 B2 12/2015 Choi et al.
9,246,204 B1 1/2016 Kabakian
9,258,884 B2 2/2016 Saito
9,356,238 B2 5/2016 Norris et al.
9,368,878 B2 6/2016 Chen et al.
9,450,281 B2 9/2016 Kim
9,537,212 B2 1/2017 Rosen et al.
9,647,313 B2 5/2017 Marconi et al.
9,653,773 B2 5/2017 Ferrari et al.
9,653,819 B1 5/2017 Izadian
9,673,532 B2 6/2017 Cheng et al.
9,806,393 B2 10/2017 Kildal et al.
9,806,431 B1 10/2017 Izadian
9,813,042 B2 11/2017 Xue et al.
9,843,301 B1 12/2017 Rodgers et al.
9,882,288 B2 1/2018 Black et al.
9,935,065 B1 4/2018 Baheti et al.
9,991,606 B2 6/2018 Kirino et al.
9,997,842 B2 6/2018 Kirino et al.
10,027,032 B2 7/2018 Kirino et al.
10,042,045 B2 8/2018 Kirino et al.
10,090,600 B2 10/2018 Kirino et al.
10,114,067 B2 10/2018 Am et al.
10,153,533 B2 12/2018 Kirino
10,158,158 B2 12/2018 Kirino et al.
10,164,318 B2 12/2018 Seok et al.
10,164,344 B2 12/2018 Kirino et al.
10,186,787 B1 1/2019 Wang et al.
10,218,078 B2 2/2019 Kirino et al.
10,230,173 B2 3/2019 Kirino et al.
10,263,310 B2 4/2019 Kildal et al.
10,283,832 B1 5/2019 Chayat et al.
10,312,596 B2 6/2019 Gregoire
10,315,578 B2 6/2019 Kim et al.
10,320,083 B2 6/2019 Kirino et al.
10,333,227 B2 6/2019 Kirino et al.
10,374,323 B2 8/2019 Kamo et al.
10,381,317 B2 8/2019 Maaskant et al.
10,381,741 B2 8/2019 Kirino et al.
10,439,298 B2 10/2019 Kirino et al.
10,468,736 B2 11/2019 Mangaiahgari
10,505,282 B2 12/2019 Lilja
10,534,061 B2 1/2020 Vassilev et al.
10,559,889 B2 2/2020 Kirino et al.
10,594,045 B2 3/2020 Kirino et al.
10,601,144 B2 3/2020 Kamo et al.
10,608,345 B2 3/2020 Kirino et al.
10,613,216 B2 4/2020 Vacanti et al.
10,622,696 B2 4/2020 Kamo et al.
10,627,502 B2 4/2020 Kirino et al.
10,649,461 B2 5/2020 Han et al.
10,651,138 B2 5/2020 Kirino et al.
10,651,567 B2 5/2020 Kamo et al.
10,658,760 B2 5/2020 Kamo et al.
10,670,810 B2 6/2020 Sakr et al.
10,705,294 B2 7/2020 Guerber et al.
10,707,584 B2 7/2020 Kirino et al.
10,714,802 B2 7/2020 Kirino et al.
10,727,561 B2 7/2020 Kirino et al.
10,727,611 B2 7/2020 Kirino et al.
10,763,590 B2 9/2020 Kirino et al.
10,763,591 B2 9/2020 Kirino et al.
10,775,573 B1 9/2020 Hsu et al.
10,811,373 B2 10/2020 Zaman et al.
10,826,147 B2 11/2020 Sikina et al.
10,833,382 B2 11/2020 Sysouphat
10,833,385 B2 11/2020 Mangaiahgari et al.
10,892,536 B2 1/2021 Fan et al.
10,944,184 B2 3/2021 Shi et al.
10,957,971 B2 3/2021 Doyle et al.
10,957,988 B2 3/2021 Kirino et al.
10,962,628 B1 3/2021 Laifenfeld et al.
10,971,824 B2 4/2021 Baumgartner et al.
10,983,194 B1 4/2021 Patel et al.
10,985,434 B2 4/2021 Wagner et al.
10,992,056 B2 4/2021 Kamo et al.
11,061,110 B2 7/2021 Kamo et al.
11,088,432 B2 8/2021 Seok et al.
11,088,464 B2 8/2021 Sato et al.
11,114,733 B2 9/2021 Doyle et al.
11,121,441 B1 9/2021 Rmili et al.
11,121,475 B2 9/2021 Yang et al.
11,169,325 B2 11/2021 Guerber et al.
11,171,399 B2 11/2021 Alexanian et al.

(56) References Cited

U.S. PATENT DOCUMENTS 11,196,171 B2 12/2021 Doyle et al.
11,201,414 B2 12/2021 Doyle et al.
11,249,011 B2 2/2022 Challener
11,283,162 B2 3/2022 Doyle et al.
11,289,787 B2 3/2022 Yang
11,349,183 B2 5/2022 Rahiminejad et al.
11,349,220 B2 5/2022 Alexanian et al.
11,378,683 B2 7/2022 Alexanian et al.
11,411,292 B2 8/2022 Kirino
11,444,364 B2 9/2022 Shi
11,495,871 B2 11/2022 Vosoogh et al.
11,563,259 B2 1/2023 Alexanian et al.
11,611,138 B2 3/2023 Ogawa et al.
11,616,282 B2 3/2023 Yao et al.
11,626,652 B2 4/2023 Vilenskiy et al.
2002/0021197 A1 2/2002 Elco
2003/0052828 A1 3/2003 Scherzer et al.
2004/0041663 A1 3/2004 Uchimura et al.
2004/0069984 A1 4/2004 Estes et al.
2004/0090290 A1 5/2004 Teshirogi et al.
2004/0174315 A1 9/2004 Miyata
2005/0146474 A1 7/2005 Bannon
2005/0237253 A1 10/2005 Kuo et al.
2006/0038724 A1 2/2006 Tikhov et al.
2006/0113598 A1 6/2006 Chen et al.
2006/0158382 A1 7/2006 Nagai
2007/0013598 A1 1/2007 Artis et al.
2007/0054064 A1 3/2007 Ohmi et al.
2007/0103381 A1 5/2007 Upton
2008/0129409 A1 6/2008 Nagaishi et al.
2008/0150821 A1 6/2008 Koch et al.
2009/0040132 A1 2/2009 Sridhar et al.
2009/0207090 A1 8/2009 Pettus et al.
2009/0243762 A1 10/2009 Chen et al.
2009/0243766 A1 10/2009 Miyagawa et al.
2009/0300901 A1 12/2009 Artis et al.
2010/0134376 A1 6/2010 Margomenos et al.
2010/0321265 A1 12/2010 Yamaguchi et al.
2011/0181482 A1 7/2011 Adams et al.
2012/0013421 A1 1/2012 Hayata
2012/0050125 A1 3/2012 Leiba et al.
2012/0056776 A1 3/2012 Shijo et al.
2012/0068316 A1 3/2012 Ligander
2012/0163811 A1 6/2012 Doany et al.
2012/0194399 A1 8/2012 Bily et al.
2012/0242421 A1 9/2012 Robin et al.
2012/0256796 A1 10/2012 Leiba
2012/0280770 A1 11/2012 Abhari et al.
2013/0057358 A1 3/2013 Anthony et al.
2013/0082801 A1 4/2013 Rofougaran et al.
2013/0300602 A1 11/2013 Zhou et al.
2014/0015709 A1 1/2014 Shijo et al.
2014/0091884 A1 4/2014 Flatters
2014/0106684 A1 4/2014 Burns et al.
2014/0327491 A1 11/2014 Kim et al.
2015/0097633 A1 4/2015 Devries et al.
2015/0229017 A1 8/2015 Suzuki et al.
2015/0229027 A1 8/2015 Sonozaki et al.
2015/0263429 A1 9/2015 Vahidpour et al.
2015/0333726 A1 11/2015 Xue et al.
2015/0357698 A1 12/2015 Kushta
2015/0364804 A1 12/2015 Tong et al.
2015/0364830 A1 12/2015 Tong et al.
2016/0043455 A1 2/2016 Seler et al.
2016/0049714 A1 2/2016 Ligander et al.
2016/0056541 A1 2/2016 Tageman et al.
2016/0118705 A1 4/2016 Tang et al.
2016/0126637 A1 5/2016 Uemichi
2016/0195612 A1 7/2016 Shi
2016/0204495 A1 7/2016 Takeda et al.
2016/0211582 A1 7/2016 Saraf
2016/0276727 A1 9/2016 Dang et al.
2016/0293557 A1 10/2016 Topak et al.
2016/0301125 A1 10/2016 Kim et al.
2017/0003377 A1 1/2017 Menge
2017/0012335 A1 1/2017 Boutayeb
2017/0084554 A1 3/2017 Dogiamis et al.
2017/0288313 A1 10/2017 Chung et al.
2017/0294719 A1 10/2017 Tatomir
2017/0324135 A1 11/2017 Blech et al.
2018/0013208 A1 1/2018 Izadian et al.
2018/0032822 A1 2/2018 Frank et al.
2018/0123245 A1 5/2018 Toda et al.
2018/0131084 A1 5/2018 Park et al.
2018/0212324 A1* 7/2018 Tatomir ............... H01Q 21/064
2018/0226709 A1 8/2018 Mangaiahgari
2018/0233465 A1 8/2018 Spella et al.
2018/0254563 A1* 9/2018 Sonozaki et al. ...... H01Q 13/18
2018/0284186 A1 10/2018 Chadha et al.
2018/0301819 A1 10/2018 Kirino et al.
2018/0301820 A1 10/2018 Bregman et al.
2018/0343711 A1 11/2018 Wixforth et al.
2018/0351261 A1 12/2018 Kamo et al.
2018/0375185 A1 12/2018 Kirino et al.
2019/0006743 A1 1/2019 Kirino et al.
2019/0013563 A1 1/2019 Takeda et al.
2019/0057945 A1 2/2019 Maaskant et al.
2019/0109361 A1 4/2019 Ichinose et al.
2019/0115644 A1 4/2019 Wang et al.
2019/0187247 A1 6/2019 Zadian et al.
2019/0245276 A1 8/2019 Li et al.
2019/0252778 A1 8/2019 Duan
2019/0260137 A1 8/2019 Watanabe et al.
2019/0324134 A1 10/2019 Cattle
2020/0021001 A1 1/2020 Mangaiahgairi
2020/0044360 A1 2/2020 Kamo et al.
2020/0059002 A1 2/2020 Renard et al.
2020/0064483 A1 2/2020 Li et al.
2020/0076086 A1 3/2020 Cheng et al.
2020/0106171 A1 4/2020 Shepeleva et al.
2020/0112077 A1 4/2020 Kamo et al.
2020/0166637 A1 5/2020 Hess et al.
2020/0203849 A1 6/2020 Lim et al.
2020/0212594 A1 7/2020 Kirino et al.
2020/0235453 A1 7/2020 Lang
2020/0284907 A1 9/2020 Gupta et al.
2020/0287293 A1 9/2020 Shi et al.
2020/0319293 A1 10/2020 Kuriyama et al.
2020/0343612 A1 10/2020 Shi
2020/0346581 A1 11/2020 Lawson et al.
2020/0373678 A1 11/2020 Park et al.
2021/0028528 A1 1/2021 Alexanian et al.
2021/0036393 A1 2/2021 Mangaiahgari
2021/0104818 A1 4/2021 Li et al.
2021/0110217 A1 4/2021 Gunel
2021/0159577 A1 5/2021 Carlred et al.
2021/0218154 A1 7/2021 Shi et al.
2021/0242581 A1 8/2021 Rossiter et al.
2021/0249777 A1 8/2021 Alexanian et al.
2021/0305667 A1 9/2021 Bencivenni
2022/0094071 A1 3/2022 Doyle et al.
2022/0109246 A1 4/2022 Emanuelsson et al.
2022/0196794 A1 6/2022 Foroozesh et al.

FOREIGN PATENT DOCUMENTS

CN 1620738 5/2005
CN 2796131 7/2006
CN 101584080 A 11/2009
CN 201383535 1/2010
CN 201868568 U 6/2011
CN 102157787 A 8/2011
CN 102420352 A 4/2012
CN 103326125 A 9/2013
CN 203277633 U 11/2013
CN 103490168 A 1/2014
CN 103515682 1/2014
CN 102142593 B 6/2014
CN 104101867 A 10/2014
CN 104900956 9/2015
CN 104993254 A 10/2015
CN 105071019 A 11/2015
CN 105609909 5/2016
CN 105680133 6/2016

(56) References Cited

FOREIGN PATENT DOCUMENTS

| | | | |
|---|---|---|---|
| CN | 105958167 | | 9/2016 |
| CN | 107317075 | A | 11/2017 |
| CN | 108258392 | A | 7/2018 |
| CN | 109286081 | A | 1/2019 |
| CN | 109643856 | A | 4/2019 |
| CN | 109980361 | A | 7/2019 |
| CN | 110085990 | A | 8/2019 |
| CN | 209389219 | | 9/2019 |
| CN | 110401022 | A | 11/2019 |
| CN | 111123210 | A | 5/2020 |
| CN | 111480090 | A | 7/2020 |
| CN | 108376821 | B | 10/2020 |
| CN | 110474137 | B | 11/2020 |
| CN | 109326863 | B | 12/2020 |
| CN | 112241007 | A | 1/2021 |
| CN | 212604823 | U | 2/2021 |
| CN | 112986951 | A | 6/2021 |
| CN | 112290182 | B | 7/2021 |
| CN | 113193323 | B | 10/2021 |
| CN | 214706247 | U | 11/2021 |
| DE | 112017006415 | | 9/2019 |
| DE | 102019200893 | | 7/2020 |
| EP | 0174579 | A2 | 3/1986 |
| EP | 0818058 | A1 | 1/1998 |
| EP | 2267841 | A1 | 12/2010 |
| EP | 2500978 | | 9/2012 |
| EP | 2843758 | | 3/2015 |
| EP | 2766224 | B1 | 12/2018 |
| EP | 3460903 | | 3/2019 |
| EP | 3785995 | A1 | 3/2021 |
| EP | 3862773 | A1 | 8/2021 |
| EP | 4089840 | A1 | 11/2022 |
| GB | 893008 | A | 4/1962 |
| GB | 2463711 | A | 3/2010 |
| GB | 2489950 | | 10/2012 |
| JP | 2000183222 | A | 6/2000 |
| JP | 2003198242 | A | 7/2003 |
| JP | 2003289201 | | 10/2003 |
| JP | 5269902 | B2 | 8/2013 |
| JP | 2013187752 | A | 9/2013 |
| JP | 2015216533 | A | 12/2015 |
| KR | 100846872 | | 5/2008 |
| KR | 1020080044752 | A | 5/2008 |
| KR | 20080105396 | A | 12/2008 |
| KR | 101092846 | B1 | 12/2011 |
| KR | 102154338 | B1 | 9/2020 |
| WO | 9934477 | A1 | 7/1999 |
| WO | 2013189513 | | 12/2013 |
| WO | 2018003932 | | 1/2018 |
| WO | 2018052335 | A1 | 3/2018 |
| WO | 2019085368 | A1 | 5/2019 |
| WO | 2020082363 | A1 | 4/2020 |
| WO | 2021072380 | A1 | 4/2021 |
| WO | 2022122319 | A1 | 6/2022 |
| WO | 2022225804 | A1 | 10/2022 |

OTHER PUBLICATIONS

"Extended European Search Report", EP Application No. 20166797, dated Sep. 16, 2020, 11 pages.
"Foreign Office Action", CN Application No. 201810122408.4, dated Jun. 2, 2021, 15 pages.
"Non-Final Office Action", U.S. Appl. No. 16/583,867, dated Feb. 18, 2020, 8 pages.
"Non-Final Office Action", U.S. Appl. No. 15/427,769, dated Nov. 13, 2018, 8 pages.
"Notice of Allowance", U.S. Appl. No. 15/427,769, dated Jun. 28, 2019, 9 pages.
"Notice of Allowance", U.S. Appl. No. 16/583,867, dated Jul. 8, 2020, 8 Pages.
Jankovic, et al., "Stepped Bend Substrate Integrated Waveguide to Rectangular Waveguide Transitions", Jun. 2016, 2 pages.
"Foreign Office Action", CN Application No. 201810122408.4, dated Oct. 18, 2021, 19 pages.
"Non-Final Office Action", U.S. Appl. No. 16/829,409, dated Oct. 14, 2021, 13 pages.
"Non-Final Office Action", U.S. Appl. No. 17/061,675, dated Dec. 20, 2021, 4 pages.
Wang, et al., "Mechanical and Dielectric Strength of Laminated Epoxy Dielectric Graded Materials", Mar. 2020, 15 pages.
"Extended European Search Report", EP Application No. 23158037.4, dated Aug. 17, 2023, 9 pages.
"Extended European Search Report", EP Application No. 23158947.4, dated Aug. 17, 2023, 11 pages.
"Foreign Office Action", CN Application No. 202111550163.3, dated Jun. 17, 2023, 25 pages.
"Foreign Office Action", CN Application No. 202111550448.7, dated Jun. 17, 2023, 19 pages.
"Foreign Office Action", CN Application No. 202111551711.4, dated Jun. 17, 2023, 29 pages.
"Foreign Office Action", CN Application No. 202111551878.0, dated Jun. 15, 2023, 20 pages.
"Foreign Office Action", CN Application No. 202111563233.9, dated May 31, 2023, 15 pages.
"Foreign Office Action", CN Application No. 202111652507.1, dated Jun. 26, 2023, 14 pages.
"Foreign Office Action", CN Application No. 202210251362.2, dated Jun. 28, 2023, 15 pages.
Ghassemi, et al., "Millimeter-Wave Integrated Pyramidal Horn Antenna Made of Multilayer Printed Circuit Board (PCB) Process", IEEE Transactions on Antennas and Propagation, vol. 60, No. 9, Sep. 2012, pp. 4432-4435.
Hausman, et al., "Termination Insensitive Mixers", 2011 IEEE International Conference on Microwaves, Communications, Antennas and Electronic Systems (COMCAS 2011), Dec. 19, 2011, 13 pages.
"Extended European Search Report", EP Application No. 21211165.2, dated May 13, 2022, 12 pages.
"Extended European Search Report", EP Application No. 21211167.8, dated May 19, 2022, 10 pages.
"Extended European Search Report", EP Application No. 21211168.6, dated May 13, 2022, 11 pages.
"Extended European Search Report", EP Application No. 21211452.4, dated May 16, 2022, 10 pages.
"Extended European Search Report", EP Application No. 21211474.8, dated Apr. 20, 2022, 14 pages.
"Extended European Search Report", EP Application No. 21211478.9, dated May 19, 2022, 10 pages.
"Extended European Search Report", EP Application No. 21216319.0, dated Jun. 10, 2022, 12 pages.
"WR-90 Waveguides", Pasternack Enterprises, Inc., 2016, Retrieved from https://web.archive.org/web/20160308205114/http://www.pasternack.com:80/wr-90-waveguides-category.aspx, 2 pages.
Alhuwaimel, et al., "Performance Enhancement of a Slotted Waveguide Antenna by Utilizing Parasitic Elements", Sep. 7, 2015, pp. 1303-1306.
Gray, et al., "Carbon Fibre Reinforced Plastic Slotted Waveguide Antenna", Proceedings of Asia-Pacific Microwave Conference 2010, pp. 307-310.
Hausman, "Termination Insensitive Mixers", 2011 IEEE International Conference on Microwaves, Communications, Antennas and Electronic Systems (COMCAS 2011), Nov. 7, 2011, 13 pages.
Li, et al., "Millimetre-wave slotted array antenna based on double-layer substrate integrated waveguide", Jun. 1, 2015, pp. 882-888.
Mak, et al., "A Magnetoelectric Dipole Leaky-Wave Antenna for Millimeter-Wave Application", Dec. 12, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.
Rossello, et al., "Substrate Integrated Waveguide Aperture Coupled Patch Antenna Array for 24 GHz Wireless Backhaul and Radar Applications", Nov. 16, 2014, 2 pages.
Shehab, et al., "Substrate-Integrated-Waveguide Power Dividers", Oct. 15, 2019, pp. 27-38.
Wang, et al., "Low-loss frequency scanning planar array with hybrid feeding structure for low-altitude detection radar", Sep. 13, 2019, pp. 6708-6711.

(56) References Cited

OTHER PUBLICATIONS

Wu, et al., "A Planar W-Band Large-Scale High-Gain Substrate-Integrated Waveguide Slot Array", Feb. 3, 2020, pp. 6429-6434.
Xu, et al., "CPW Center-Fed Single-Layer SIW Slot Antenna Array for Automotive Radars", Jun. 12, 2014, pp. 4528-4536.
Yu, et al., "Optimization and Implementation of SIW Slot Array for Both Medium- and Long-Range 77 GHz Automotive Radar Application", IEEE Transactions on Antennas and Propagation, vol. 66, No. 7, Jul. 2018, pp. 3769-3774.
"Extended European Search Report", EP Application No. 20155296.5, dated Jul. 13, 2020, 12 pages.
"Extended European Search Report", EP Application No. 21212703.9, dated May 3, 2022, 13 pages.
"Extended European Search Report", EP Application No. 21215901.6, dated Jun. 9, 2022, 8 pages.
"Extended European Search Report", EP Application No. 22160898.7, dated Aug. 4, 2022, 11 pages.
"Extended European Search Report", EP Application No. 22183888.1, dated Dec. 20, 2022, 10 pages.
"Extended European Search Report", EP Application No. 22183892.3, dated Dec. 2, 2022, 8 pages.
"Extended European Search Report", EP Application No. 22184924.3, dated Dec. 2, 2022, 13 pages.
"Foreign Office Action", CN Application No. 202010146513.9, dated Feb. 7, 2022, 14 pages.
Bauer, et al., "A wideband transition from substrate integrated waveguide to differential microstrip lines in multilayer substrates", Sep. 2010, pp. 811-813.
Chaloun, et al., "A Wideband 122 GHz Cavity-Backed Dipole Antenna for Millimeter-Wave Radar Altimetry", 2020 14th European Conference on Antennas and Propagation (EUCAP), Mar. 15, 2020, 4 pages.
Deutschmann, et al., "A Full W-Band Waveguide-to-Differential Microstrip Transition", Jun. 2019, pp. 335-338.
Furtula, et al., "Waveguide Bandpass Filters for Millimeter-Wave Radiometers", Journal of Infrared, Millimeter and Terahertz Waves, 2013, 9 pages.
Giese, et al., "Compact Wideband Single-ended and Differential Microstrip-to-waveguide Transitions at W-band", Jul. 2015, 4 pages.
Hansen, et al., "D-Band FMCW Radar Sensor for Industrial Wideband Applications with Fully-Differential MMIC-to-RWG Interface in SIW", 2021 IEEE/MTT-S International Microwave Symposium, Jun. 7, 2021, pp. 815-818.
Hasan, et al., "F-Band Differential Microstrip Patch Antenna Array and Waveguide to Differential Microstrip Line Transition for FMCW Radar Sensor", IEEE Sensors Journal, vol. 19, No. 15, Aug. 1, 2019, pp. 6486-6496.
Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.
Lin, et al., "A THz Waveguide Bandpass Filter Design Using an Artificial Neural Network", Micromachines 13(6), May 2022, 11 pages.
Ogiwara, et al., "2-D MoM Analysis of the Choke Structure for Isolation Improvement between Two Waveguide Slot Array Antennas", Proceedings of Asia-Pacific Microwave Conference 2007, 4 pages.
Razmhosseini, et al., "Parasitic Slot Elements for Bandwidth Enhancement of Slotted Waveguide Antennas", 2019 IEEE 90th Vehicular Technology Conference, Sep. 2019, 5 pages.
Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.
Serrano, et al., "Lowpass Filter Design for Space Applications in Waveguide Technology Using Alternative Topologies", Jan. 2013, 117 pages.
Tong, et al., "A Wide Band Transition from Waveguide to Differential Microstrip Lines", Dec. 2008, 5 pages.
Wang, et al., "A 79-GHz LTCC differential microstrip line to laminated waveguide transition using high permittivity material", Dec. 2010, pp. 1593-1596.
Wu, et al., "The Substrate Integrated Circuits—A New Concept for High-Frequency Electronics and Optoelectronics", Dec. 2003, 8 pages.
Yuasa, et al., "A millimeter wave wideband differential line to waveguide transition using short ended slot line", Oct. 2014, pp. 1004-1007.
"Extended European Search Report", EP Application No. 22166998.9, dated Sep. 9, 2022, 12 pages.
Adams, et al., "Dual Band Frequency Scanned, Height Finder Antenna", 1991 21st European Microwave Conference, 1991, 6 pages.
Aulia Dewantari et al., "Flared SIW antenna design and transceiving experiments for W-band SAR", International Journal of RF and Microwave Computer-Aided Engineering, Wiley Interscience, Hoboken, USA, vol. 28, No. 9, May 9, 2018, XP072009558.

* cited by examiner

TWO-PART FOLDED WAVEGUIDE HAVING A SINUSOIDAL SHAPE CHANNEL INCLUDING HORN SHAPE RADIATING SLOTS FORMED THEREIN WHICH ARE SPACED APART BY ONE-HALF WAVELENGTH

CROSS-REFERENCE TO RELATED APPLICATION

This application claims the benefit under 35 U.S.C. 119(e) of U.S. Provisional Application No. 63/188,265, filed May 13, 2021, the disclosure of which is hereby incorporated by reference in its entirety herein.

BACKGROUND

Some devices (e.g., radar) use electromagnetic signals to detect and track objects. The electromagnetic signals are transmitted and received using one or more antennas. An antenna may be characterized in terms of gain, beam width, or, more specifically, in terms of the antenna pattern, which is a measure of the antenna gain as a function of direction. Certain applications may benefit from precisely controlling the antenna pattern. A folded waveguide is a millimeter-sized component that may be used to improve desirable antenna characteristics; gradient lobes may be reduced or eliminated as unwanted electromagnetic radiation is allowed to leak from a folded or sinusoidal shaped channel (e.g., filled with air or other dielectric), which is embedded in the small component. Forming a small waveguide with a complex internal channel structure can be too difficult and, therefore, too expensive to be produced at a cost and scale (e.g., millions of units) required to support some industries that require improved antenna characteristics, including automotive and communication technology sectors.

SUMMARY OF THE INVENTION

This document describes techniques, systems, apparatuses, and methods for utilizing a two-part folded waveguide with horns. In one example, an apparatus includes a two-part folded waveguide with horns, which may be an air waveguide (in this document referred to as a waveguide). Securing the two parts of the waveguide does not require use of a conductive bonding layer, such as a dielectric paste, during manufacture because of a horn structure on a plurality of radiation slots of the waveguide. The horn structure allows for alternative means to secure the first part of the waveguide to the second part. The described waveguide includes a channel which forms a rectangular opening along a longitudinal axis at one end, and a sinusoidal shape that folds back and forth about the longitudinal axis that extends in the longitudinal direction along the channel. The channel further forms a plurality of radiation slots in the shape of a horn, each of the radiation slots including a respective hole extending through one of multiple surfaces of the two-part folded waveguide that defines the channel. The first part of the waveguide is separated from the second part of the waveguide by a layer of material.

In another example, a method for manufacturing a two-part folded waveguide with horns is described in accordance with techniques, systems, apparatuses, and methods of this disclosure. The method includes forming two parts of a two-part folded waveguide with horns, aligning the two parts of the two-part folded waveguide with horns, and securing the two parts of the two-part folded waveguide with horns. The two parts of the two-part folded waveguide with horns may be stamped, etched, cut, machined, cast, molded, or formed by injection molding. The two parts of the two-part folded waveguide with horns may be secured by a plastic fastener, a metal fastener, or a double-sided adhesive.

This Summary introduces simplified concepts related to a two-part folded waveguide with horns, which are further described below in the Detailed Description and Drawings. In addition, systems, as well as other techniques, systems, apparatuses, and methods are described below. This Summary is not intended to identify essential features of the claimed subject matter, nor is it intended for use in determining the scope of the claimed subject matter.

BRIEF DESCRIPTION OF THE DRAWINGS

The details of a two-part folded waveguide with horns are described in this document with reference to the following figures:

FIG. 2-1 illustrates a top-view of an example two-part folded waveguide with horns, in accordance with this disclosure;

FIG. 2-2 illustrates a top-view of another example two-part folded waveguide with horns, in accordance with, in accordance with this disclosure;

FIG. 2-3 illustrates a side view of the example two-part folded waveguide with horns, in accordance with this disclosure;

FIG. 3 illustrates ways for securing two parts of an example two-part folded waveguide with horns, in accordance with this disclosure;

The same numbers are often used throughout the drawings and the detailed description to reference like features and components.

DETAILED DESCRIPTION OF THE INVENTION

Overview

Figure 1:
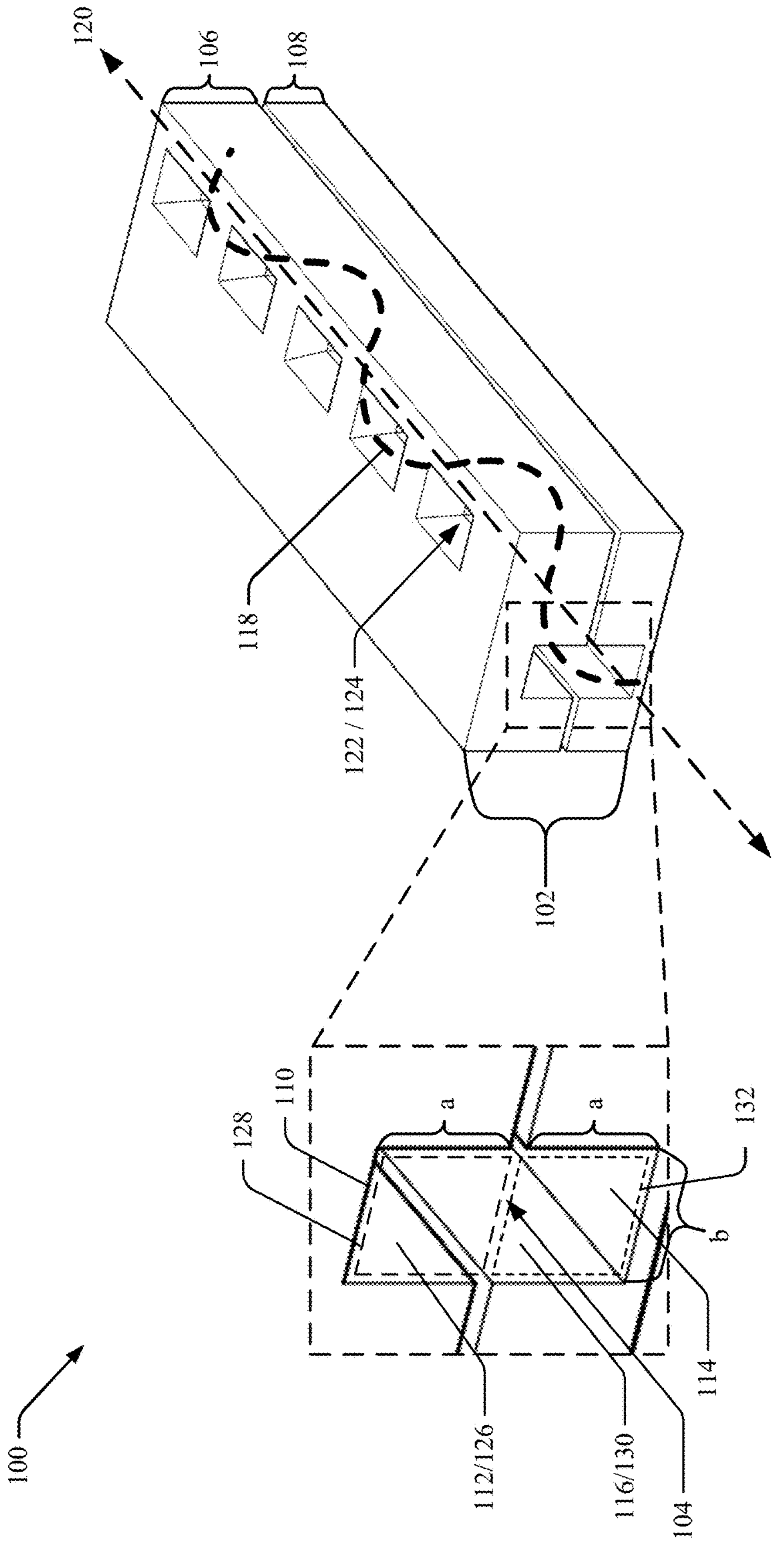
FIG. 1 illustrates an example environment for a two-part folded waveguide with horns, in accordance with this disclosure.

Some devices (e.g., radar) use electromagnetic signals to detect and track objects. The electromagnetic signals are transmitted and received using one or more antennas. An antenna may be characterized in terms of gain, beam width, or, more specifically, in terms of the antenna pattern, which is a measure of the antenna gain as a function of direction. Certain applications may benefit from precisely controlling the antenna pattern. A folded waveguide is a millimeter-sized component that may be used to improve some antenna characteristics; gradient lobes may be reduced or eliminated as unwanted electromagnetic energy is allowed to leak from a folded or sinusoidal shaped channel (e.g., filled with air) embedded in the component. Forming a waveguide with an internal folded channel can be too difficult and, therefore, too expensive to be produced at a cost and scale (e.g., millions of units) required to support some industry, including automotive and communication technology sectors.

In contrast, this document describes a two-part folded waveguide with horns. For example, an apparatus includes a two-part folded waveguide having multiple surfaces that define a channel, the two-part folded waveguide including a first part of the waveguide with a first surface from the multiple surfaces, the first surface having a sinusoidal shape that folds back and forth about a longitudinal axis that extends in a longitudinal direction through the channel and a plurality of radiation slots. Each of the radiation slots is in a shape of a horn that forms a respective hole extending through the first surface and into the channel. At least one second surface from the multiple surfaces is part of the first part and is perpendicular to the first surface to define an upper half of walls of the channel that are normal to the first surface. The first part further includes a first feature at one end of the waveguide defining a portion of a rectangular opening in the longitudinal direction and through to the channel. A second part of the waveguide is arranged adjacent to and parallel with the first part with a third surface from the multiple surfaces being parallel to the first surface and having the same sinusoidal shape as the first surface. At least one fourth surface from the multiple surfaces is between the second surface and the third surface and perpendicular to the first surface and the third surface. The fourth surface defines a lower half of the walls of the channel. The second part further includes a second feature at the same end of the waveguide as the first feature; the second feature defines a remaining portion of the rectangular opening that is not defined by the first feature.

In addition, this document describes an example method for manufacturing a two-part folded waveguide with horns. The method includes forming a first part of the waveguide such that the first part includes a first surface from the multiple surfaces, the first surface having a sinusoidal shape that folds back and forth about a longitudinal axis that extends in a longitudinal direction through the channel and a plurality of radiation slots, each of the radiation slots in a shape of a horn that forms a respective hole extending through the first surface and into the channel. Forming the first part further includes including at least one second surface from the multiple surfaces that is perpendicular to the first surface to define an upper half of walls of the channel that are normal to the first surface. The first part is further formed with a first feature at one end of the waveguide, the first feature defining a portion of a rectangular opening in the longitudinal direction and through to the channel. The method further includes forming a second part of the waveguide such that the second part of the waveguide includes a third surface from the multiple surfaces having the same sinusoidal shape as the first surface. The forming of the second part includes forming at least one fourth surface from the multiple surfaces to be perpendicular to the third surface. The fourth surface defines a lower half of the walls of the channel. The second part further includes a second feature at the same end of the waveguide as the first feature; the second feature defines a remaining portion of the rectangular opening that is not defined by the first feature. The method further includes arranging the second part of the waveguide to be adjacent to and parallel with the first part of the waveguide by orientating the first part of the waveguide with the second part of the waveguide to align the first feature of the first part of the waveguide with the second feature of the second part of the waveguide and aligning the upper half of the walls of the channel that are normal to the first surface of the first part of the waveguide with the lower half of the walls of the channel that are perpendicular to the third surface to cause the sinusoidal shape of the first and second parts of the waveguide to be aligned in parallel. In some examples there is a gap between the first and second parts. In other examples, there is a zero gap (e.g., direct contact between the two parts) or a small gap filled with materials of various types. If a gap is present, any unwanted effects that would otherwise result in an antenna pattern, are compensated by the horns.

This is just one example of the described techniques, systems, apparatuses, and methods of a two-part folded waveguide with horns. This document describes other examples and implementations.

Example Apparatus

FIG. 1 illustrates an example apparatus 100 for a two-part folded waveguide 102 with horns 124, in accordance with techniques, systems, apparatuses, and methods of this disclosure. The two-part folded waveguide 102 with horns 124 can be formed in accordance with example processes described herein, including using the processes described in FIG. 5. In general, the waveguide 102 is configured to channel energy associated with electromagnetic signals being transmitted through air to an antenna, a transceiver, a device, or other component that transmits or receives the electromagnetic signals, for example, to perform a function. For example, the apparatus 100 may be part of a sensor system (e.g., a radar system). The waveguide 102 may be integrated in the sensor system and coupled to an antenna or other component; these components are omitted from FIG. 1 for clarity.

The waveguide 102 may have multiple surfaces 110, 112, 114, and 116 that define a channel 104, or hollow core, for capturing the energy of electromagnetic signals transmitted through air. The channel 104 may be filled with air, or another suitable dielectric material. The channel 104 has a folding or a sinusoidal shape 118, which folds back and forth about a longitudinal axis 120 that extends in a longitudinal direction along a length of the waveguide 102, and a corresponding length of the channel 104.

The waveguide 102 may be constructed from metal, plastic, wood, or combinations thereof. No matter the construction material, it may be difficult to form a waveguide with a hollow core that has the sinusoidal shape 118 of the channel 104.

It is desirable to form the waveguide 102 with at least two separate parts (e.g. part one 106 and part two 108). However, this can introduce gaps and other irregularities in size or shape of the waveguide 102, which can cause unwanted effects in an antenna pattern. As is described below, the waveguide 102 can compensate for any unwanted effects that would otherwise come from forming the waveguide 102 out of more than one part, even if there are gaps. This compensation is provided at least in part by using a plurality of radiation slots 122 that are shaped as the horns 124. Each radiation slot from the plurality of radiation slots 122 includes a longitudinal slot that is parallel to the longitudinal axis 120 to produce a horizontal-polarized antenna pattern. The specific size and position of the radiation slots 122 can be determined using modeling and testing to arrive at their position and size to produce the particular desired antenna pattern.

The waveguide 102 includes at least two-parts, a first part 106 and a second part 108. When oriented and arranged in parallel (e.g., with some gap or no gap between), the first part 106 and the second part 108 create the channel 104. That is, the channel 104 includes interior surfaces formed by the surfaces 110, 112, 114, and 116 of the two parts 106 and 108. Specifically, the first part 106 includes the first surface 110, which provides a ceiling to the channel 104, which gives the channel 104 the sinusoidal shape 118 thereof (e.g., for eliminating gradient lobes). The first surface 110 also provides the plurality of radiation slots 122, which each have a shape of a horn 124. Each of the horns 124 is configured to form a respective hole extending through the first surface 110 and into the channel 104, to allow for electromagnetic energy leakage. The horns 124 can allow electromagnetic energy to escape the channel 104, thereby filtering the electromagnetic energy that remains in the channel 104 to be within a specific operating frequency for the channel 104 (or waveguide 102).

The first part 106 of the waveguide 102 also includes at least one second surface 112. The second surface 112 is perpendicular to the first surface 110 and is configured to define an upper half 126 of walls of the channel 104 that are normal to the first surface 110. When aligned, the two parts 106 and 108 divide the waveguide 102 (e.g., in half) laterally, which is perpendicular to the longitudinal axis 120. The first surface 110 provides the ceiling of the channel 104, through which the radiation slots 122 are formed, and the upper half of the walls that follow the sinusoidal shape 128 on both sides of the of the channel 104.

The waveguide 102 includes an opening (e.g., a rectangular opening) at one end of the channel 104 in the longitudinal direction 120, at which electromagnetic energy can enter the channel 104. A first feature 128 of the first part 106 is positioned at the same end of the waveguide 102 as the opening. The first feature 128 defines a portion of the opening that is created by a portion of the first surface 110 combined with a portion of the second surface 112 with the upper half 126 of the walls.

The second part 108 of the waveguide 102 is arranged adjacent to and parallel with the first part 106, in such a way so the channel 104 is formed. The second part 108 of the waveguide includes the third surface 114, and at least one fourth surface, including the fourth surface 116. The third surface 114 may be parallel to the first surface 110 and may include the same sinusoidal shape 118 as the first surface 110. The third surface 114 can be considered to form a floor of the channel 104, that is parallel to and opposite the ceiling formed by the first surface 110.

The fourth surface 116 is arranged between the second surface 112 and the third surface 114. The fourth surface 116 is perpendicular to both the first surface 110 and the third surface 114 so that the fourth surface 116 is congruent with the second surface 112. The fourth surface 116 is configured to define a remaining, lower half 130 of the walls of the channel 104. In other words, the fourth surface 116 is configured to extend or lengthen the walls partially formed by the second surface 112 to adjoin the walls to the floor of the channel 104 defined by the third surface 114. The lower half 130 of the walls meet the upper half 126 of the walls to form a consistent interior surface, on either side of the channel 104, that folds back and forth in the sinusoidal shape 118.

The second part 108 of the waveguide 102 also includes a second feature 132 at the same end of the waveguide as the first feature 128. The second feature 132 defines a remaining portion of the opening to the channel 104, which is not already defined by the first feature 128. In other words, when the first part 106 and the second part 108 are arranged in parallel as shown in FIG. 1, the first feature 128 in combination with the second feature 132 form the opening in the longitudinal direction 120 through the channel 104. In other words, each of the two parts 106 and 108 may include a corresponding feature 128 and 132 on a same end, which together, define the opening to the channel 104. The first feature 128 has a height "a" and a width "b". The second feature 132 has the same height "a" and width "b". The overall dimensions of the opening to the channel 104 includes a total height (e.g., a+a) which is twice the width (e.g. b is equal to a divided by two).

As such, the waveguide 102 with horns 124 provides several advantages over other waveguides, including being be easier to manufacture, in addition to providing a better antenna pattern that is free from gradient lobes or other unwanted antenna pattern characteristics that may appear when multiple parts are used and gaps are formed. By using a specific horn-shaped radiation slot, in combination with a two-part formation of a folded or sinusoidal-shaped internal channel 104, the waveguide 102 demonstrates enhanced stability for manufacturing purposes over a typical waveguide.

Figures 1, 2:
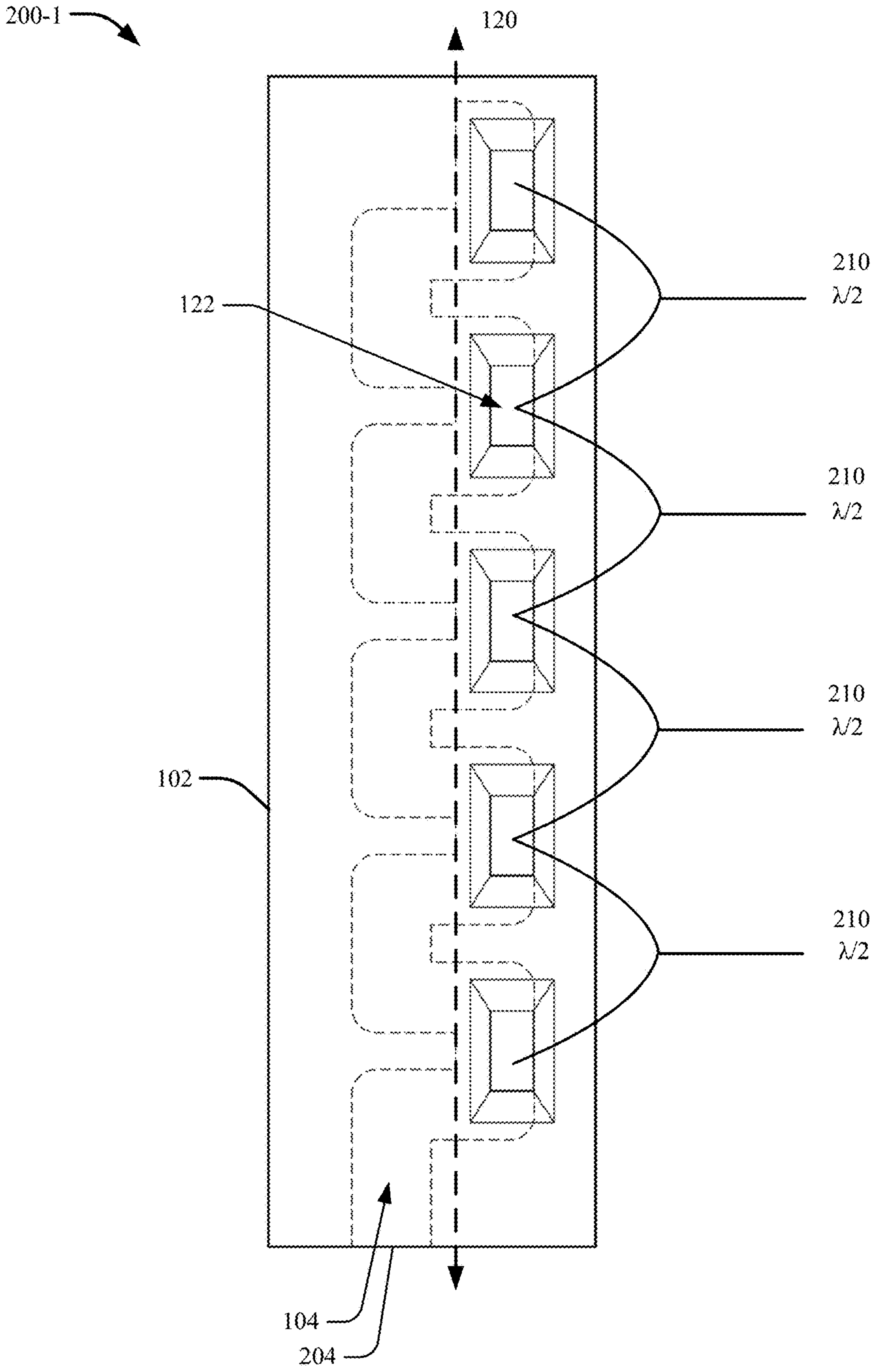
Figure 2:
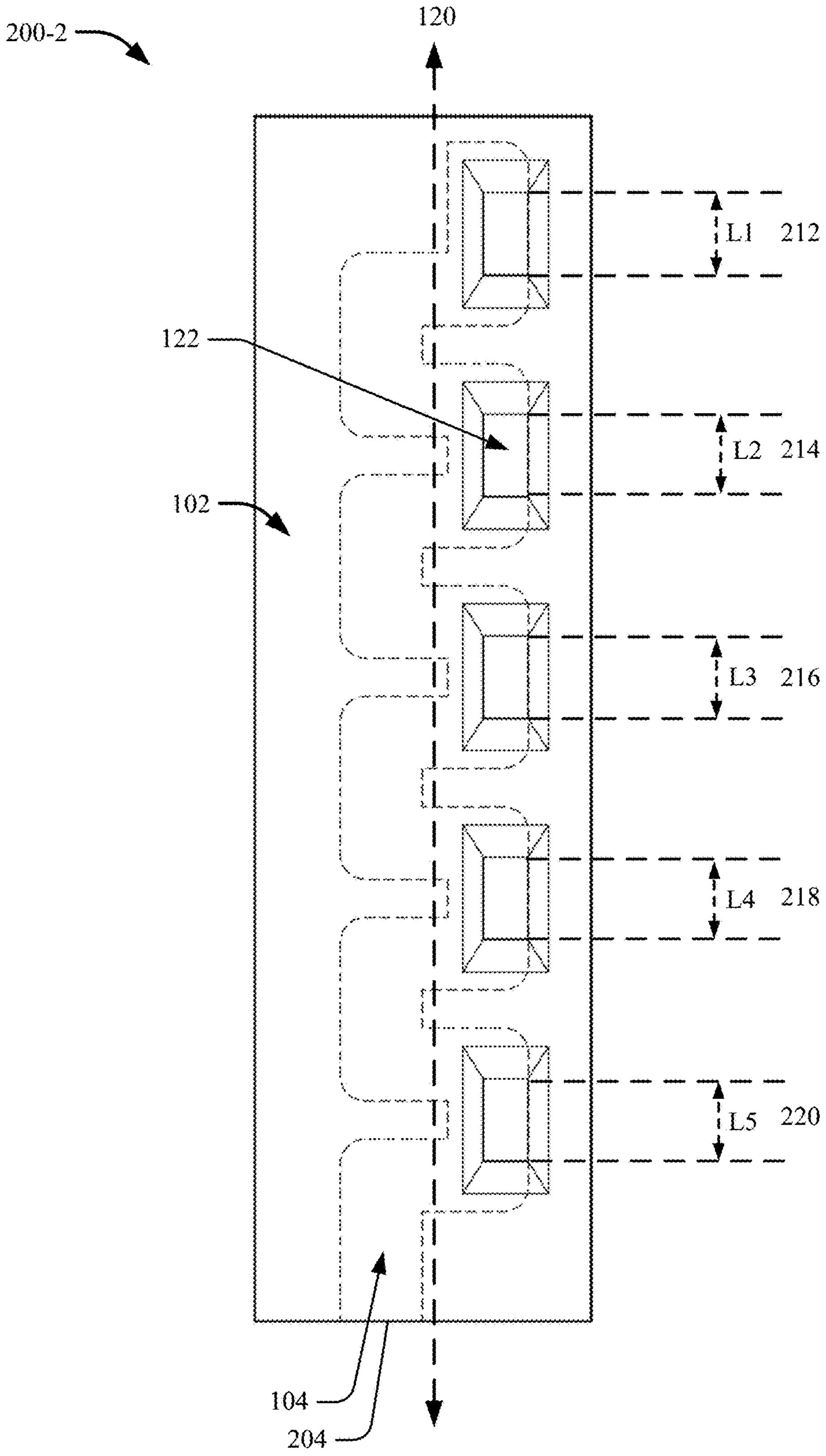

FIG. 2-1 illustrates a top-view 200-1 of an example two-part folded waveguide 102 with horns in accordance with the techniques, systems, apparatuses, and methods techniques, systems, apparatuses, and methods of this disclosure. The two-part folded waveguide 102 with horns may be manufactured from a composition of plastic, metal, composite materials, or wood. The waveguide 102 includes multiple surfaces (i.e., the first surface 110, the second surface 112, the third surface 114, and the fourth surface 116) as shown in FIG. 1 that define a channel 104 that extends along the longitudinal axis 120. The channel 104 has a rectangular opening 204 at one end of the waveguide 102. The rectangular opening 204 at one end of the waveguide 102 allows electromagnetic energy to enter the channel 104. The undesired wavelengths of the electromagnetic energy are allowed to leak out of the waveguide 102 through the plurality of radiation slots 122 in the shape of a horn, effectively filtering the electromagnetic energy for a specific operating frequency for the channel 104 (or waveguide 102).

The plurality of radiation slots 122 may be evenly distributed along the longitudinal axis 120 through the channel 104. A common distance 210 between each of the plurality of radiation slots 122 along the longitudinal axis 120 is one half a desired operating frequency or signal wavelength (e.g., $\lambda/2$), intended to be transmitted or received using the two-part folded waveguide 102 with horns 124. This separation by the common distance 210 can prevent grating lobes and ensure undesired wavelengths of electromagnetic energy are filtered out from a specific desired operating frequency for the channel 104 (or waveguide 102). The common distance 210 is less than one wavelength of the electromagnetic radiation that that is not allowed to leak out of the channel 104 by the radiation slots 122.

FIG. 2-2 illustrates a top-view 200-2 of another example two-part folded waveguide 102 with horns, with varying lengths 212, 214, 216, 218, and 220 also labeled in FIG. 2-2 as "L1", "L2", "L3", "L4", and "L5", respectively) of the plurality of radiation slots 122 with horns within the waveguide 102, in accordance with techniques, systems, apparatuses, and methods of this disclosure. The varying lengths 212, 214, 216, 218, and 220 allow undesired wavelengths of electromagnetic energy to leak out of the waveguide 102 while ensuring the desired wavelength of electromagnetic energy reaches the reaches the end of the channel 104 opposite the rectangular opening 204. The waveguide 102 having multiple surfaces 110, 112, 114, and 116 as shown in FIG. 1 that define a channel 104 that extends along the longitudinal axis 120. Each of the plurality of radiation slots 122 is sized and positioned to produce a particular antenna pattern. The specific size and position of the radiation slots 122 can be determined by building and optimizing a model of the waveguide 106 to produce the particular antenna pattern desired.

Figures 2, 3:
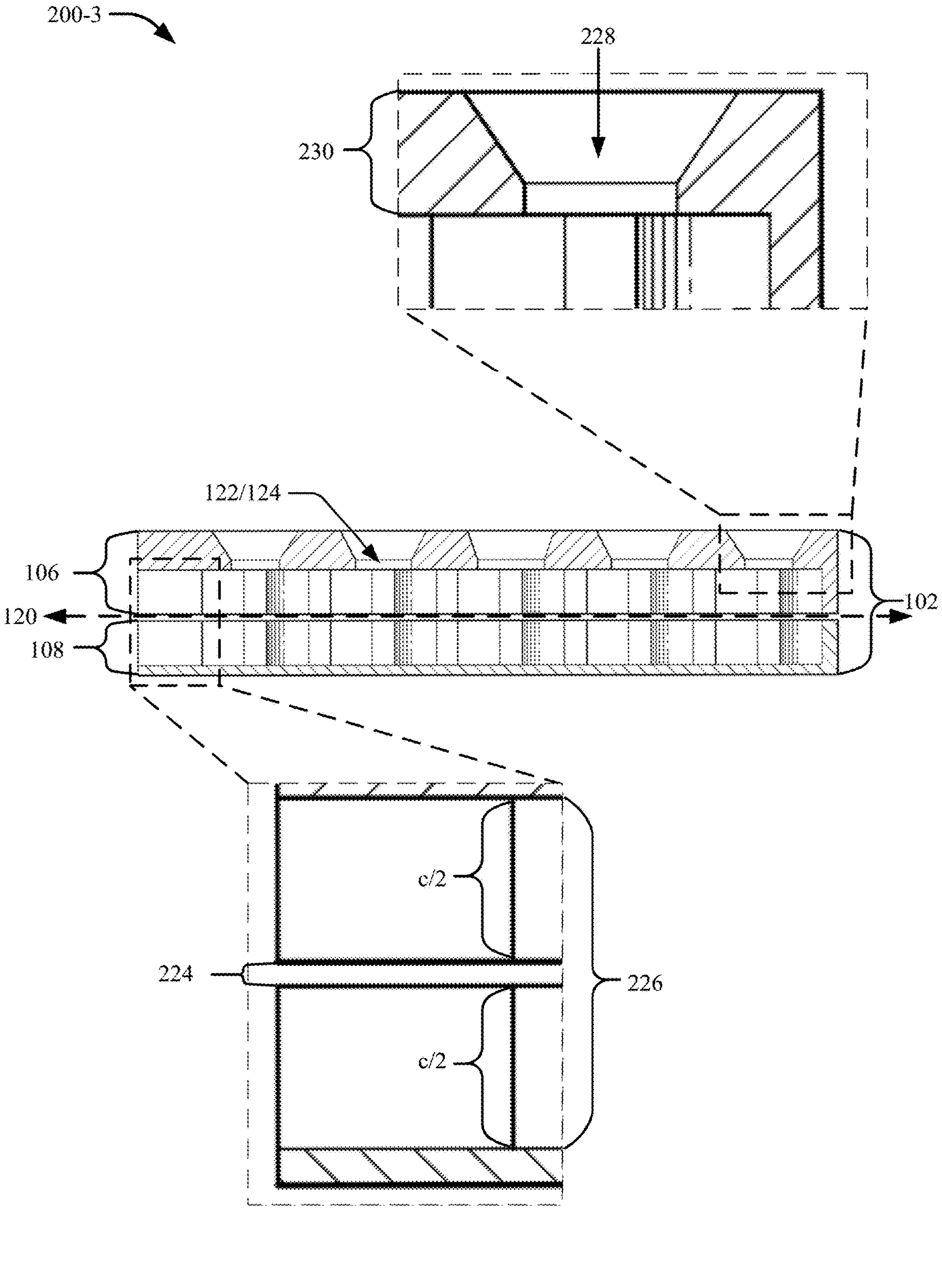
Figure 3:
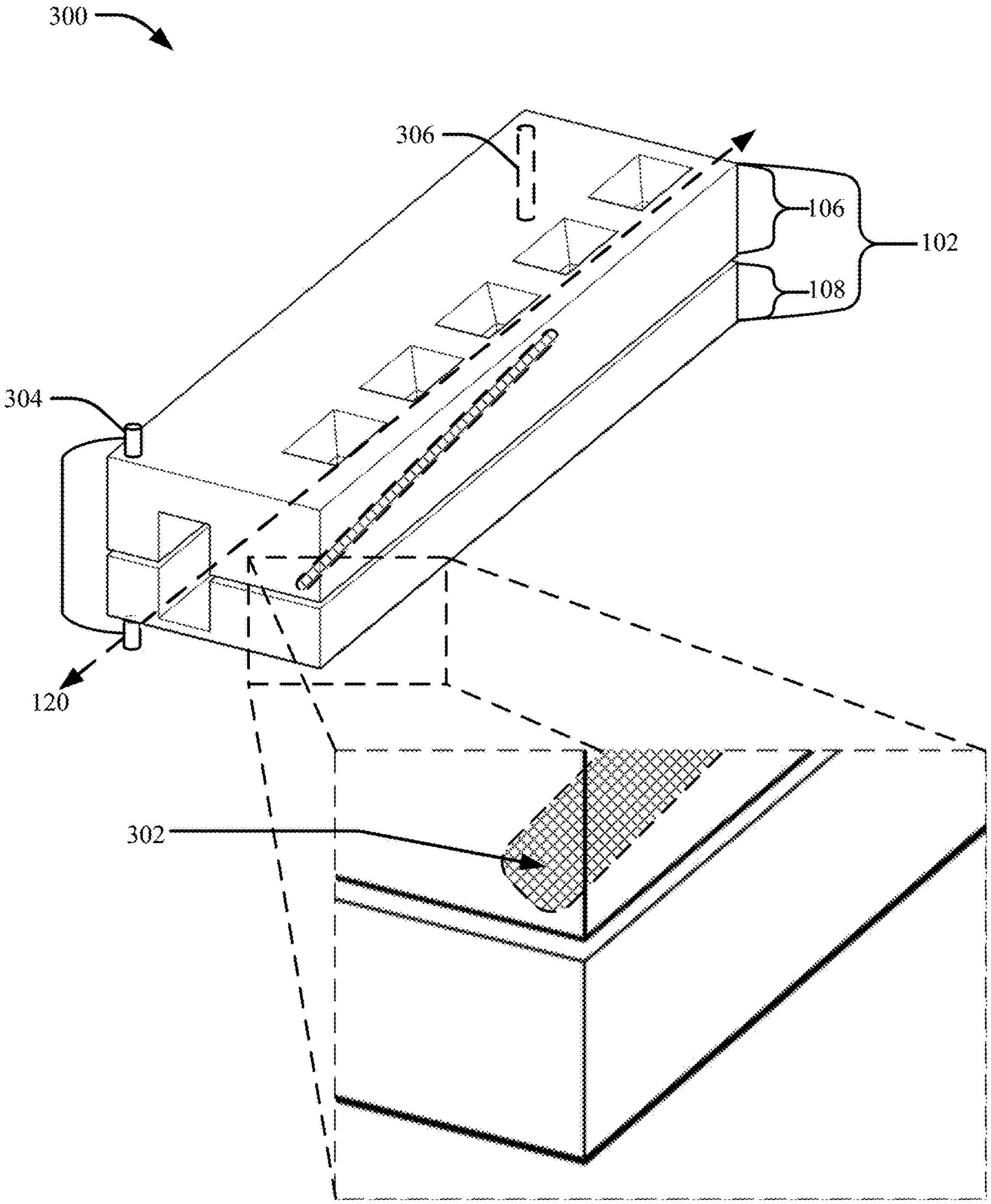

FIG. 2-3 illustrates a side-view 200-3 of another example two-part folded waveguide 102 with horns 124, in accordance with techniques, systems, apparatuses, and methods of this disclosure. The first part 106 of the waveguide 102 is separated from the second part 108 of the waveguide by a layer of material 224 measuring less than twenty percent of the overall height "c" 226 of the waveguide in a direction perpendicular to the longitudinal axis 120. The first part 106, measures "c/2", which is one half the overall height "c" 226, absent the height of the plurality of radiation slots 122 in the shape of a horn 124. The second part 108, measures "c/2", which is one half the overall height "c" 226, absent the height of the plurality of radiation slots 122 in the shape of a horn 124. The layer of material 224 may be air or a dielectric material other than air. The layer of material 224 is introduced due to forming the waveguide 102 with horns 124 from two parts.

An individual horn 228 from the radiation slots 122 in the shape of a horn 124 on the waveguide 102 is illustrated. The radiation slots 122 in the shape of a horn 124 allow the first part 106 of the waveguide 102 to be constructed with additional structural stability resulting from the enhanced thickness 230 of the waveguide 102. The structural stability ensures quality in manufacturing of the millimeter-sized waveguide 102 which may otherwise suffer from gradient lobes resulting from manufacturing defects. The problem of forming a small waveguide 102 at the scale (e.g., millions of units) required to support some industries that require improved antenna characteristics is solved by the enhanced structural stability, which is compensated for using the horns 124 to provide an affordable waveguide solution.

FIG. 3 illustrates examples 300 of securing a two-part folded waveguide 102 with horns. One example technique to secure the two-part folded waveguide 102 with horns utilizes a double-sided adhesive 302, in accordance with techniques, systems, apparatuses, and methods of this disclosure. In another example, the first part 106 of the waveguide may be secured to the second part 108 of the waveguide by an external fastener 304. The external fastener 304 could include a plastic fastener or a metal fastener. In yet another example, the first part 106 of the waveguide may be secured to the second part 108 of the waveguide by an internal fastener 306. The internal fastener 306 could include a plastic fastener or a metal fastener.

The waveguide 102 can be formed using a combination of one or more of the above techniques, and other techniques as well, for maintaining alignment and even separation between the two parts 106 and 108. The enhanced thickness 230 of the waveguide 102, resulting from the addition of a plurality of radiation slots 122 in the shape of a horn 124 as shown in FIG. 2-3, provides increased structural stability for the waveguide 102 and increased efficacy of the external fastener 304 and internal fastener 306 in keeping part one 106 secured to part two 108 of the waveguide 102.

Figure 4:
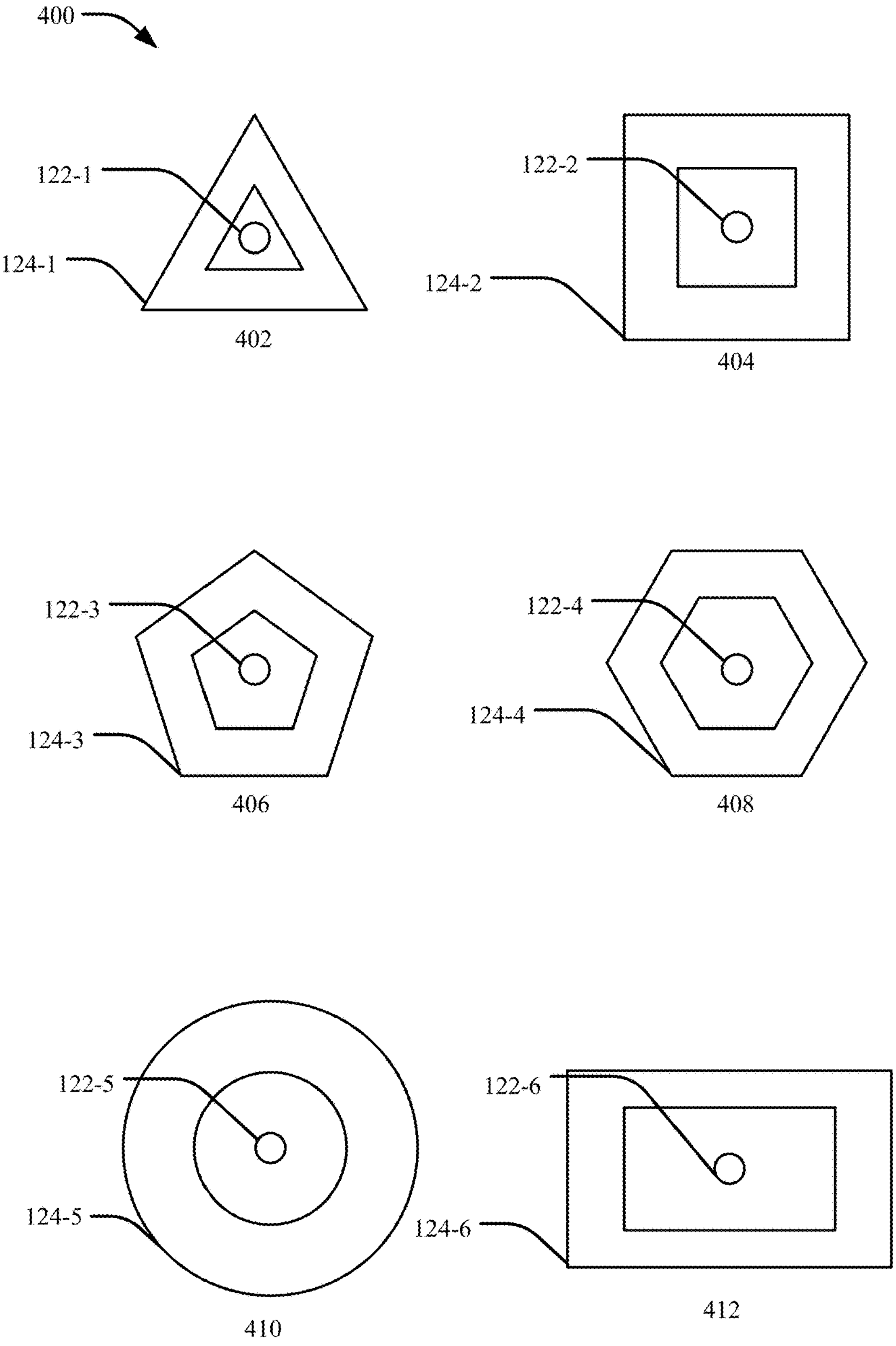
FIG. 4 illustrates different shapes of horns and respective radiation slots, in accordance with this disclosure.

FIG. 4 illustrates different shapes of horns 400 in accordance with techniques, systems, apparatuses, and methods of this disclosure. The individual radiation slots 122, as shown in FIGS. 1, 2-1, 2-2, and 2-3, may include different horn shapes. For example, FIG. 4 includes an example of a radiation slot 122-1 in the shape of a horn 124-1 where the horn 124-1 is a triangular pyramid horn 402. Another example of a radiation slot 122-2 is in the shape of a horn 124-2 where the horn 124-2 is a square pyramid horn 404. A radiation slot 122-3 in the shape of a horn 124-3 where the horn 124-3 is a pentagonal pyramid horn 406. A radiation slot 122-4 in the shape of a horn 124-4 where the horn 124-4 is a hexagonal pyramid horn 408. A radiation slot 122-5 in the shape of a horn 124-5 where the horn 124-5 is a circular pyramid horn 410. Lastly, shown is a radiation slot 122-6 in the shape of a horn 124-6 where the horn 124-6 is a rectangular pyramid horn 412. The waveguide 102, as shown in FIGS. 1, 2-1, 2-2, and 2-3 may utilize the same horn structure for each radiation slot (e.g. each radiation slot is a pentagonal pyramid horn). Alternatively, the waveguide 102, as shown in FIGS. 1, 2-1, 2-2, and 2-3 may utilize a variety of horn structures for the radiation slots (e.g. some of the horn structures are in the shape of a triangular pyramid horn 402 and some of the horn structures are in a different shape as the triangular pyramid horn 402). In any case, the size and shape of the horns 124-1, 124-2, 124-3, 124-4, 124-4, 124-5, or 124-6, including any of the horn shapes (402, 404, 406, 408, 410, and 412), may be selected to be easy to manufacture at a millimeter-sized or smaller dimension, while still achieving desired antenna effects.

Example Method

Figure 5:
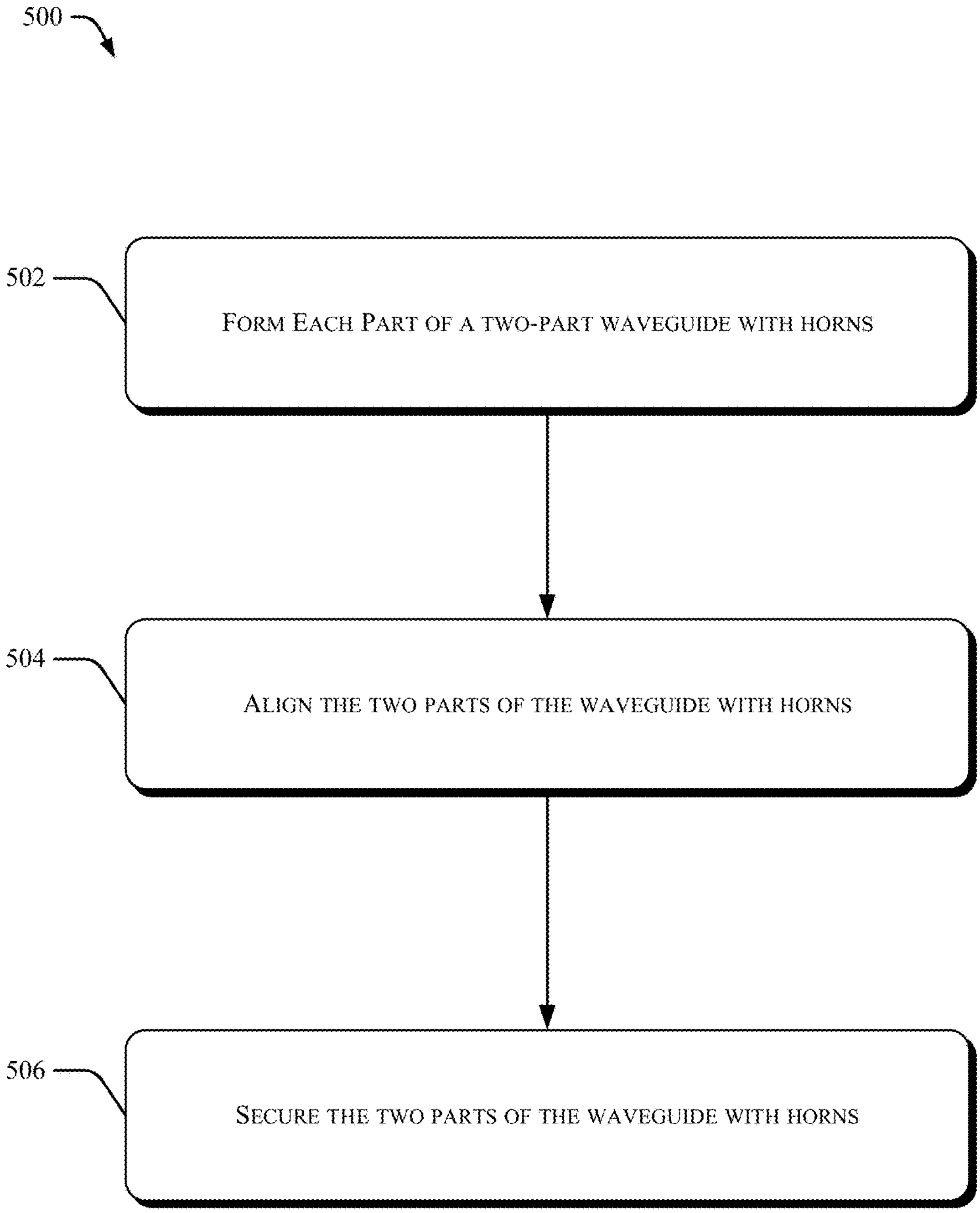
FIG. 5 depicts an example process for forming a two-part folded waveguide with horns, in accordance with this disclosure.

FIG. 5 depicts an example method that can be used for manufacturing a two-part folded waveguide with horns, in accordance with techniques, systems, apparatuses, and methods of this disclosure. The process 500 is shown as a set of operations 502, 504, and through 506, which are performed in, but not limited to, the order or combinations in which the operations are shown or described. Further, any of the operations 502, 504 and 506 may be repeated, combined, or reorganized to provide other methods. The techniques are not limited to performance by one entity or multiple entities.

At operation 502, each part of a two-part waveguide with horns is formed. For example, the two parts of the two-part folded waveguide with horns may be stamped, etched, cut, machined, cast, molded, or formed in some other way as a result of the increased stability provided by the horns. At operation 504, each part of the two parts of the waveguide with horns are aligned. Optimal alignment ensures the waveguide operates without suffering from gradient lobes resulting from manufacturing defects. At operation 506, each part of the two parts of the waveguide with horns are secured. The two parts of the two-part folded waveguide with horns may be secured by an external fastener or internal fastener including a plastic fastener, a metal fastener, or a double-sided adhesive.

In aspects, the method may include manufacturing two parts of a two-part folded waveguide with horns having multiple surfaces that define a channel by at least forming a first part of the waveguide. The first part of the waveguide includes a first surface from one of the multiple surfaces. The first surface is shown having a folding or a sinusoidal shape that folds back and forth about a longitudinal axis that extends along the longitudinal axis of the first part. The waveguide also possesses a plurality of radiation slots, each of the radiation slots is in a shape of a horn. The horn is configured to form a respective hole extending through the first surface and into the channel. The horn can let electromagnetic energy escape the channel as the waveguide filters the electromagnetic energy to be within a specific frequency for the channel.

The first part of the waveguide possess at least one second surface from the multiple surfaces. The second surface is perpendicular to the first surface and is configured to define an upper half of walls of the channel that are normal to the first surface. The first part also includes a first feature at one end of the waveguide that defines a portion of a rectangular opening in the longitudinal direction and through to the channel.

A second part of the waveguide may be arranged adjacent to and parallel with the first part. The second part of the waveguide includes a third surface from the multiple surfaces. The third surface may be parallel to the first surface and may include the same sinusoidal shape as the first surface. The second part of the waveguide includes at least a fourth surface from the multiple surfaces between the second surface and the third surface. The fourth surface being perpendicular to the first surface and the third surface, the fourth surface defining a lower half of the walls of the channel. The second part of the waveguide includes a second feature at the same end of the waveguide as the first feature, the second feature defining a remaining portion of the rectangular opening that is not defined by the first feature.

In additional aspects, the method may include arranging the second part of the waveguide to be adjacent to and parallel with the first part of the waveguide. The first part of the waveguide is oriented with the second part of the waveguide to align the first feature of the first part of the waveguide with the second feature of the second part of the waveguide. The upper half of the walls of the channel that are normal to the first surface of the first part of the waveguide are aligned with the lower half of the walls of the channel that are perpendicular to the third surface to cause the sinusoidal shape of the first and second parts of the waveguide to be aligned in parallel. Arranging the second part of the waveguide to be adjacent to and parallel with the first part of the waveguide may include evenly separating the first part of the waveguide from the second part of the waveguide by a layer of material measuring less than twenty percent of a total size of the channel defined by the lower and upper halves of the walls.

The first part of the waveguide may be secured to the second part of the waveguide with a fastener that maintains the first part and second part of the waveguide in a parallel arrangement. The fastener may be an external fastener or an internal fastener. The fastener may be a plastic fastener or a metal fastener. The first part of the waveguide may be secured to the second part of the waveguide by an adhesive bond between the second surface and the fourth surface. The first part of the waveguide and the second part of the waveguide may be secured through an adhesive bond between the second surface and the fourth surface. The adhesive bond may be a dielectric, an epoxy, a glue, or a double-sided tape.

Example Graph

Figure 6:
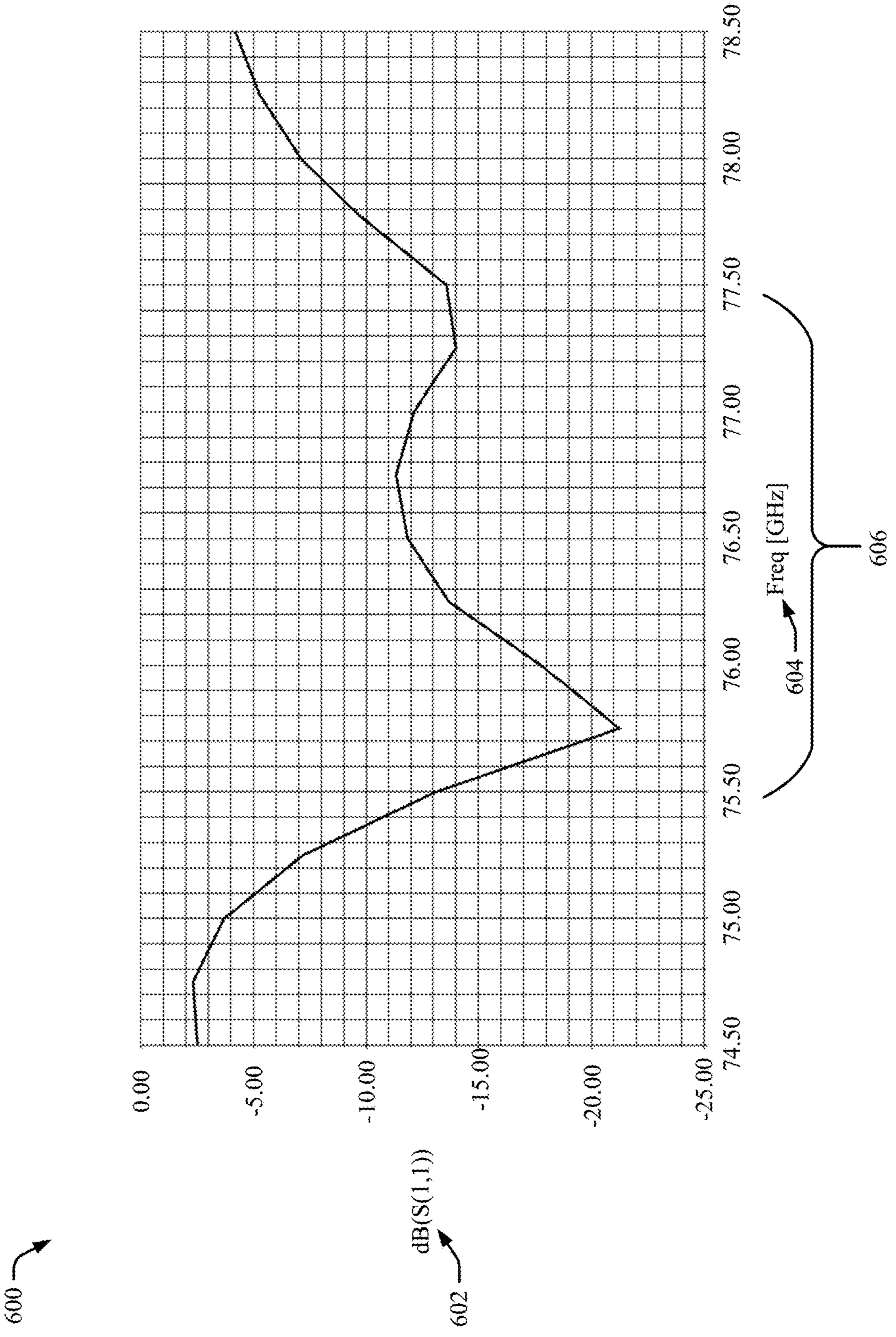
FIG. 6 illustrates a graph demonstrating antenna characteristics in accordance with this disclosure.

FIG. 6 illustrates a graph 600 demonstrating antenna characteristics in accordance with techniques, systems, apparatuses, and methods of this disclosure. For example, the graph 600 includes a reflection coefficient (dB(S(1,1)) 602 on the y-axis as well as a frequency (GHz) 604 on the x-axis within a frequency range 606. A small reflection coefficient 602 is indicative of low overall reflectance. In aspects, an effective waveguide demonstrates a reflection coefficient below −10 dB. In the graph 600, a two-part folded waveguide with horns demonstrates a reflection coefficient below −10 dB between the frequency range 606, which is from 75.50 GHz and 77.50 GHz.

Figure 7:
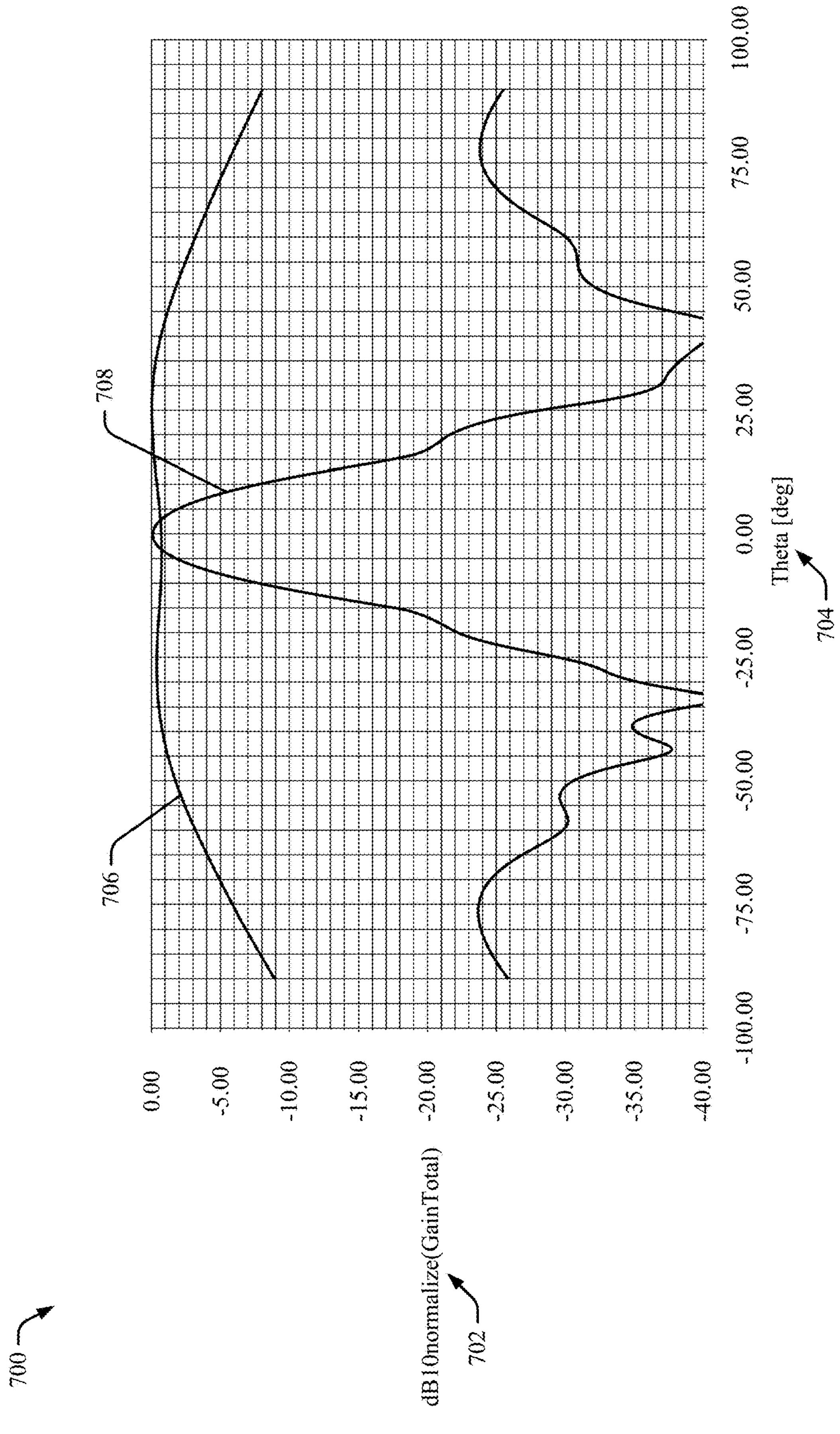
FIG. 7 illustrates another graph demonstrating antenna characteristics in accordance with this disclosure.

FIG. 7 illustrates another graph 700 demonstrating antenna characteristics in accordance with techniques, systems, apparatuses, and methods of this disclosure. For example, the graph 700 includes a normalized decibel level (dB10normalize(GainTotal)) 702 indicating antenna gain on the y-axis as well as a Theta (deg) 704 of a bore sight on the x-axis. The graph 700 includes a wide beam pattern 706 and a narrow beam pattern 708. In aspects, an effective waveguide demonstrates low side lobes (e.g. less than −20 dB). In the graph 700, a two-part folded waveguide with horns, demonstrates low side lobes below −20 dB for a bore sight of 0 degrees.

ADDITIONAL EXAMPLES

In the following section, additional examples of a folded waveguide for antenna are provided.

Example 1

An apparatus comprising a two-part folded waveguide having multiple surfaces that define a channel, the two-part folded waveguide including: a first part of the waveguide comprising: a first surface from the multiple surfaces, the first surface having: a sinusoidal shape that folds back and forth about a longitudinal axis that extends in a longitudinal direction through the channel; and a plurality of radiation slots, each of the radiation slots in a shape of a horn that forms a respective hole extending through the first surface and into the channel; at least one second surface from the multiple surfaces, the second surface being perpendicular to the first surface to define an upper half of walls of the channel that are normal to the first surface; and a first feature at one end of the waveguide, the first feature defining a portion of a rectangular opening in the longitudinal direction and through to the channel; a second part of the waveguide arranged adjacent to and parallel with the first part, the second part of the waveguide comprising: a third surface from the multiple surfaces, the third surface being parallel to the first surface and having the same sinusoidal shape as the first surface; at least one fourth surface from the multiple surfaces between the second surface and the third surface, the fourth surface being perpendicular to the first surface and the third surface, the fourth surface defining a lower half of the walls of the channel; and a second feature at the same end of the waveguide as the first feature, the second feature defining a remaining portion of the rectangular opening that is not defined by the first feature.

Example 2

The apparatus of any preceding example, wherein the first part of the waveguide is evenly separated from the second part of the waveguide by a layer of material.

Example 3

The apparatus of any preceding example, wherein the first part of the waveguide is evenly separated from the second part of the waveguide by a layer of material measuring less than twenty percent of a total size of the channel defined by the lower and upper halves of the walls.

Example 4

The apparatus of any preceding example, wherein the layer of material separating the first part of the waveguide from the second part of the waveguide comprises air.

Example 5

The apparatus of any preceding example, wherein the layer of material separating the first part of the waveguide from the second part of the waveguide comprises a dielectric material other than air configured to maintain the first part of the waveguide at a fixed position relative to the second part of the waveguide.

Example 6

The apparatus of any preceding example, wherein the first part of the waveguide is secured to the second part of the waveguide with a metal fastener configured to maintain the first part of the waveguide at a fixed position relative the second part of the waveguide.

Example 7

The apparatus of any preceding example, wherein the first part of the waveguide is secured to the second part of the waveguide with a plastic fastener configured to maintain the first part of the waveguide at a fixed position relative to the second part of the waveguide.

Example 8

The apparatus of any preceding example, wherein the first part of the waveguide is secured to the second part of the waveguide with a double-sided adhesive configured to maintain the first part of the waveguide at a fixed position relative to the second part of the waveguide.

Example 9

The apparatus of any preceding example, wherein the two-part folded waveguide comprises one or more materials including plastic, metal, composite materials, or wood.

Example 10

The apparatus of any preceding example, wherein the plurality of radiation slots comprises different horn shapes, including: a triangular shaped pyramid horn; a square shaped pyramid horn; a pentagonal shaped pyramid horn; a hexagonal shaped pyramid horn; a circular shaped pyramid horn; or a rectangular shaped pyramid horn.

Example 11

The apparatus of any preceding example, wherein the plurality of radiation slots are evenly distributed between the rectangular opening and an end of the waveguide arranged opposite the rectangular opening along the longitudinal axis that extends in the longitudinal direction through the channel.

Example 12

The apparatus of any preceding example, wherein a common distance between each horn along the longitudinal axis is $\lambda/2$.

Example 13

A method, the method comprising: manufacturing two parts of a two-part folded waveguide with horns having multiple surfaces that define a channel by at least: forming a first part of the waveguide such that the first part includes: a first surface from the multiple surfaces, the first surface having: a sinusoidal shape that folds back and forth about a longitudinal axis that extends in a longitudinal direction through the channel; and a plurality of radiation slots, each of the radiation slots in a shape of a horn that forms a respective hole extending through the first surface and into the channel; at least one second surface from the multiple surfaces, the second surface being perpendicular to the first surface to define an upper half of walls of the channel that are normal to the first surface; and a first feature at one end of the waveguide, the first feature defining a portion of a rectangular opening in the longitudinal direction and through to the channel; forming a second part of the waveguide such that the second part of the waveguide includes: a third surface from the multiple surfaces, the third surface having the same sinusoidal shape as the first surface; at least one fourth surface from the multiple surfaces, the fourth surface being perpendicular to the third surface, the fourth surface defining a lower half of the walls of the channel; and a second feature at the same end of the waveguide as the first feature, the second feature defining a remaining portion of the rectangular opening that is not defined by the first feature; and arranging the second part of the waveguide to be adjacent to and parallel with the first part of the waveguide by: orientating the first part of the waveguide with the second part of the waveguide to align the first feature of the first part of the waveguide with the second feature of the second part of the waveguide; and aligning the upper half of the walls of the channel that are normal to the first surface of the first part of the waveguide with the lower half of the walls of the channel that are perpendicular to the third surface to cause the sinusoidal shape of the first and second parts of the waveguide to be aligned in parallel.

Example 14

The method of any preceding example, wherein arranging the second part of the waveguide to be adjacent to and parallel with the first part of the waveguide comprises evenly separating the first part of the waveguide from the second part of the waveguide by a layer of material measuring less than twenty percent of a total size of the channel defined by the lower and upper halves of the walls.

Example 15

The method of any preceding example, wherein forming each of the first part and the second part of the waveguide comprises using injection molding.

Example 16

The method of any preceding example, further comprising: securing the first part of the waveguide to the second part of the waveguide in response to the arranging.

Example 17

The method of any preceding example, wherein securing the first part of the waveguide to the second part of the waveguide comprises securing with a fastener maintains the first and second parts of the waveguide in a parallel arrangement.

Example 18

The method of any preceding example, wherein a fastener comprises at least one of a plastic fastener or a metal fastener.

Example 19

The method of any preceding example, wherein securing the first part of the waveguide and the second part of the waveguide comprises securing with causing an adhesive bond between the second surface and the fourth surface.

Example 20

The method of any preceding example, wherein causing the adhesive bond comprises using a dielectric, an epoxy, a glue, or a double-sided tape.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. An apparatus comprising a two-part folded waveguide having multiple surfaces that define a channel for a desired wavelength λ, the two-part folded waveguide including:

a first part of the waveguide comprising:

a first surface from the multiple surfaces, the first surface having:

a sinusoidal shape that folds back and forth about a longitudinal axis that extends in a longitudinal direction through the channel; and a plurality of radiation slots, each of the radiation slots in a shape of a horn that forms a respective hole extending through the first surface and into the channel, wherein a common distance between each horn along the longitudinal axis is one half the desired wavelength λ;

at least one second surface from the multiple surfaces, the second surface being perpendicular to the first surface to define an upper half of walls of the channel that are normal to the first surface; and one end of the first part defining a portion of a rectangular opening in the longitudinal direction and extending through to the channel;

a second part of the waveguide arranged adjacent to and parallel with the first part, the second part of the waveguide comprising:

a third surface from the multiple surfaces, the third surface being parallel to the first surface and having the same sinusoidal shape as the first surface;

at least one fourth surface from the multiple surfaces between the second surface and the third surface, the fourth surface being perpendicular to the first surface and the third surface, the fourth surface defining a lower half of the walls of the channel; and one end of the second part defining a remaining portion of the rectangular opening that is not defined by the first part.

2. The apparatus of claim 1, wherein the first part of the waveguide is evenly separated from the second part of the waveguide by a layer of material measuring less than twenty percent of a total size of the channel defined by the lower and upper halves of the walls.

3. The apparatus of claim 1, wherein the first part of the waveguide is evenly separated from the second part of the waveguide by a layer of material.

4. The apparatus of claim 3, wherein the layer of material separating the first part of the waveguide from the second part of the waveguide comprises air.

5. The apparatus of claim 3, wherein the layer of material separating the first part of the waveguide from the second part of the waveguide comprises a dielectric material other than air configured to maintain the first part of the waveguide at a fixed position relative to the second part of the waveguide.

6. The apparatus of claim 3, wherein the first part of the waveguide is secured to the second part of the waveguide with a metal fastener configured to maintain the first part of the waveguide at a fixed position relative the second part of the waveguide.

7. The apparatus of claim 3, wherein the first part of the waveguide is secured to the second part of the waveguide with a plastic fastener configured to maintain the first part of the waveguide at a fixed position relative to the second part of the waveguide.

8. The apparatus of claim 3, wherein the first part of the waveguide is secured to the second part of the waveguide with a double-sided adhesive configured to maintain the first part of the waveguide at a fixed position relative to the second part of the waveguide.

9. The apparatus of claim 1, wherein the two-part folded waveguide comprises one or more materials including plastic, metal, composite materials, or wood.

10. The apparatus of claim 1, wherein the plurality of radiation slots comprises different horn shapes, including:

a triangular shaped pyramid horn;

a square shaped pyramid horn;

a pentagonal shaped pyramid horn;

a hexagonal shaped pyramid horn;

a circular shaped pyramid horn; or a rectangular shaped pyramid horn.

11. The apparatus of claim 1, wherein the plurality of radiation slots are evenly distributed between the rectangular opening and another end of the first part arranged opposite the rectangular opening along the longitudinal axis that extends in the longitudinal direction through the channel.

12. A method, the method comprising:

manufacturing two parts of a two-part folded waveguide with horns having multiple surfaces that define a channel for a desired wavelength λ, by at least:

forming a first part of the waveguide such that the first part includes:

a first surface from the multiple surfaces, the first surface having:

a sinusoidal shape that folds back and forth about a longitudinal axis that extends in a longitudinal direction through the channel; and a plurality of radiation slots, each of the radiation slots in a shape of a horn that forms a respective hole extending through the first surface and into the channel, wherein a common distance between each horn along the longitudinal axis is one half the desired wavelength λ;

at least one second surface from the multiple surfaces, the second surface being perpendicular to the first surface to define an upper half of walls of the channel that are normal to the first surface; and one end of the first part defining a portion of a rectangular opening in the longitudinal direction and extending through to the channel;

forming a second part of the waveguide such that the second part of the waveguide includes:

a third surface from the multiple surfaces, the third surface having the same sinusoidal shape as the first surface;

at least one fourth surface from the multiple surfaces, the fourth surface being perpendicular to the third surface, the fourth surface defining a lower half of the walls of the channel; and one end of the second part defining a remaining portion of the rectangular opening that is not defined by the first part; and arranging the second part of the waveguide to be adjacent to and parallel with the first part of the waveguide by:

orientating the first part of the waveguide with the second part of the waveguide to align the portion of the rectangular opening with the remaining portion of the rectangular opening; and aligning the upper half of the walls of the channel that are normal to the first surface of the first part of the waveguide with the lower half of the walls of the channel that are perpendicular to the third surface to cause the sinusoidal shape of the first and second parts of the waveguide to be aligned in parallel.

13. The method of claim 12, wherein arranging the second part of the waveguide to be adjacent to and parallel with the first part of the waveguide comprises evenly separating the first part of the waveguide from the second part of the waveguide by a layer of material measuring less than twenty percent of a total size of the channel defined by the lower and upper halves of the walls.

14. The method of claim 13, wherein securing the first part of the waveguide and the second part of the waveguide comprises securing with causing an adhesive bond between the second surface and the fourth surface.

15. The method of claim 14, wherein causing the adhesive bond comprises using a dielectric, an epoxy, a glue, or a double-sided tape.

16. The method of claim 12, further comprising:

securing the first part of the waveguide to the second part of the waveguide in response to the arranging.

17. The method of claim 16, wherein securing the first part of the waveguide to the second part of the waveguide comprises securing with a fastener maintains the first and second parts of the waveguide in a parallel arrangement.

18. The method of claim 16, wherein a fastener comprises at least one of a plastic fastener or a metal fastener.

19. The method of claim 12, wherein forming each of the first part and the second part of the waveguide comprises using injection molding.

* * * * *